(12) United States Patent  
Hagen et al.

(10) Patent No.: US 7,194,182 B2  
(45) Date of Patent: Mar. 20, 2007

(54) METHODS AND APPARATUSES USING A FIBER-FLEXURE INDUCTION SOLDERING STATION

(75) Inventors: Ron A. Hagen, San Jose, CA (US); Rickie Charles Lake, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 10/304,195

(22) Filed: Nov. 25, 2002

(65) Prior Publication Data

US 2004/0101005 A1    May 27, 2004

(51) Int. Cl.
*G02B 6/00* (2006.01)
(52) U.S. Cl. .................. 385/137; 385/136; 385/52
(58) Field of Classification Search ............ 385/88–93, 385/52, 134, 147, 136, 137
See application file for complete search history.

(56) References Cited

U.S. PATENT DOCUMENTS 4,854,667 A *   8/1989   Ebata et al. ................. 385/134
6,415,087 B1 *  7/2002   Yang et al. .................. 385/123
6,574,411 B2 *  6/2003   Seguin ....................... 385/137

OTHER PUBLICATIONS

DeGarmo et al., "Materials and Processes in Manufacturing", 7th Edition, Copyright© 1988 Macmillan Publishing Company 866 Third Avenue, New York, New York, 10022, pp. 4 total. (1998).
David T. Reid, "Fundamentals of Tool Design", Third Edition, Based on Fundamentals of Tool Design, Second Edition Edward G. Hoffman, Ph.D., Editor, Published by Society of Manufacturing Engineers, Publications Development Department, One SME Drive, P.O Box 930, Dearborn, MI 48121-0930, Published prior to this application's filing date. (1984).

* cited by examiner

*Primary Examiner*—Kevin S. Wood
(74) *Attorney, Agent, or Firm*—Blakely, Sokoloff, Taylor & Zafman LLP

(57) ABSTRACT

Various methods, apparatuses, and systems in which an alignment tool holds an optical fiber and an optical alignment component in place during induction soldering. The alignment tool has alignment adjustments for the optical fiber as well as the optical alignment component. An induction soldering station induction solders the optical fiber to the optical alignment component in order to secure the optical fiber to the optical alignment component.

22 Claims, 7 Drawing Sheets

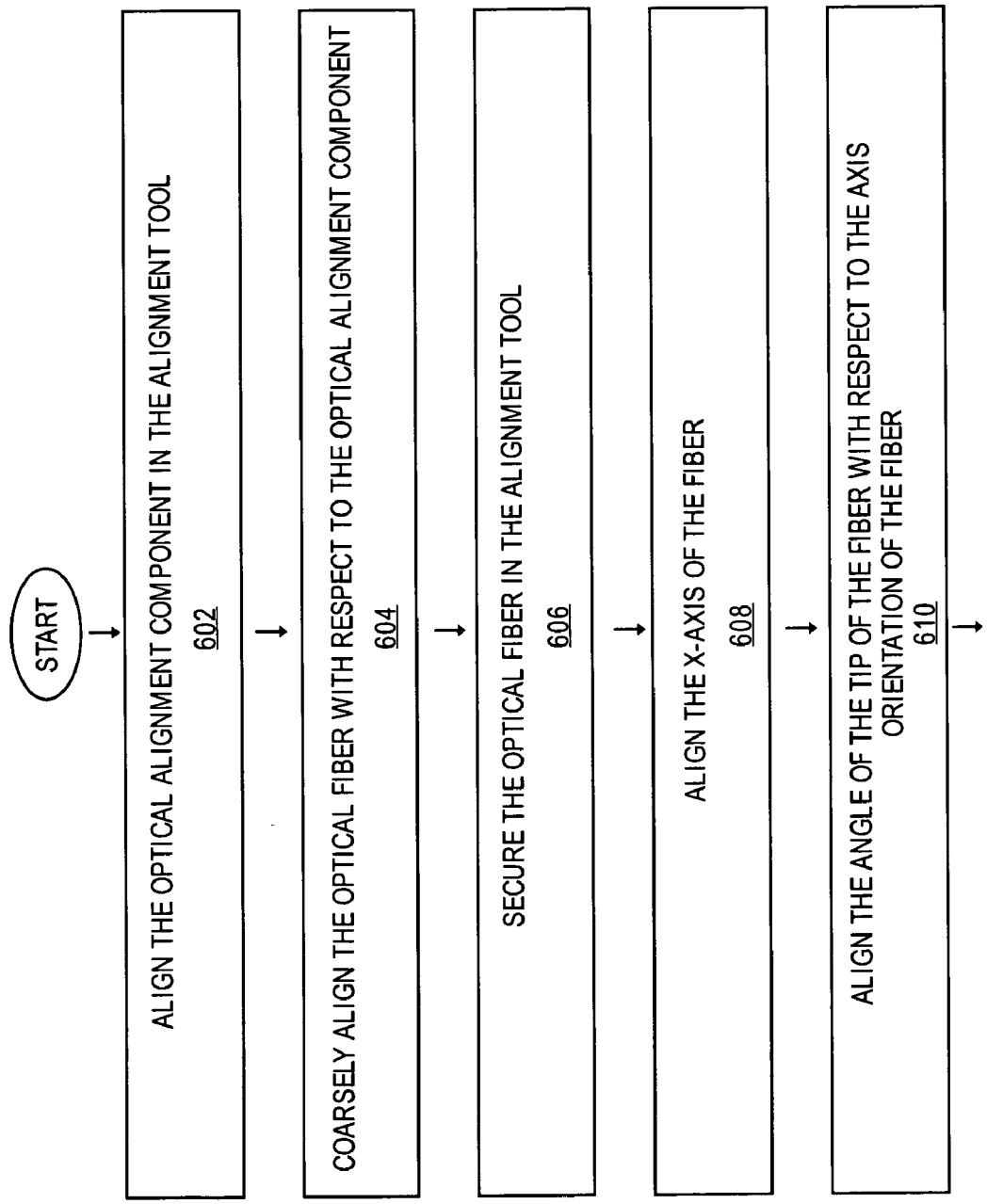

METHODS AND APPARATUSES USING A FIBER-FLEXURE INDUCTION SOLDERING STATION

FIELD OF THE INVENTION

Embodiments of the invention generally relate to optical components. More particularly, an aspect of an embodiment of the invention relates to induction soldering of an optical fiber to an optical alignment component.

BACKGROUND OF THE INVENTION

Sealed packages are necessary to contain, protect, couple to optical fibers and electrically connect optoelectronic components. Optoelectronics packaging can be one of the most difficult and costly operations in optoelectronics manufacturing. Optoelectronic packages provide submicron alignment between optical elements, high-speed electrical connections, excellent heat dissipation, and high reliability. Providing such features results in optoelectronic packages that are larger, costlier and more difficult to manufacture than electronic packages. In addition, current designs of optoelectronic packages and associated fabrication processes are ill adapted for automation because today's high-performance butterfly packages are characterized by a large multiplicity of mechanical parts (submounts, brackets, ferrules, etc.), three-dimensional (3D) alignment requirements, and poor mechanical accessibility.

One type of package for an edge-coupled optoelectronic device includes a cover with a window, so that an optoelectronic device, such as a laser, may be coupled to external optics, such as a lens or an optical fiber. See, for example, U.S. Pat. No. 4,953,006 by Kovatz. Although this type of package can provide hermeticity and high-speed electrical connections, it does not provide for a way to mount and align collimation or coupling optics nor optical fibers.

U.S. Pat. No. 5,005,178 by Kluitmans and Tjassens and U.S. Pat. No. 5,227,646 by Shigeno also disclose packages for optical and optoelectronic components. Kluitmans et al. discuss a package for a laser diode coupled to an optical fiber. The package includes a conducting rod so that the laser may be used at high speed. Shigeno describes a heat sink for cooling an enclosed laser diode, where the laser diode is preferably coupled to an optical fiber. However, in both of the above patents, it is difficult to align the laser diode with the optical fiber when constructing the package. Both designs use numerous parts in complex three dimensional arrangements and are unsuitable for automated assembly. U.S. Pat. No. 5,628,196 by Farmer discloses a package including a heat sink for a semiconductor laser, but provides no efficient means for coupling the laser to other optics.

In most current types of packages, it can be difficult to align the laser diode with the optical fiber when constructing the package. The process of aligning an optical fiber to a laser diode and fixing it in place is known as fiber pigtailing. Current designs use numerous parts in complex three dimensional arrangements that can be unsuitable for automated assembly. Similarly, on the receive side of optical packages, it can be difficult to align the receiving component with the optical fiber.

The difficulty in alignment during fiber pigtailing is made more problematic where soldering is involved in the manufacturing of a package. The result of the soldering process causes a shift to occur in the structure being soldered due to shrinkage of the molten weld material while it is solidifying. Therefore, even though something is aligned prior to soldering, the result of the soldering process may cause such shifts to occur. Where micron accuracy is needed, these shifts affect the overall yield.

Typically, in prior optical alignment techniques, the optical fiber and flexure were soldered together or bonded together when they were placed inside the optical package. The optical fiber and flexure were then aligned at that time with components already in the optical package. Thus, the optical package was built up and the flexure, the optical fiber, the optical fiber in respect to the flexure, and one or more components inside the package that optically mate up to the combination of the fiber and flexure were all aligned at the same time.

Some aligning techniques can be used to reduce the effect of such post soldering shifting including pre-compensation for post soldering shifting, laser hammering, or "bending" of the parts after soldering. However, the overall yield can still be low even with these techniques because often too much correction and aligning of components has to be done.

BRIEF DESCRIPTION OF THE DRAWINGS

The drawings refer to the invention in which:

FIG. 6a and FIG. 6b illustrate a flow diagram of an operational sequence to generate an optical package made by an embodiment of the alignment tool and the induction soldering station.

Figure 1:
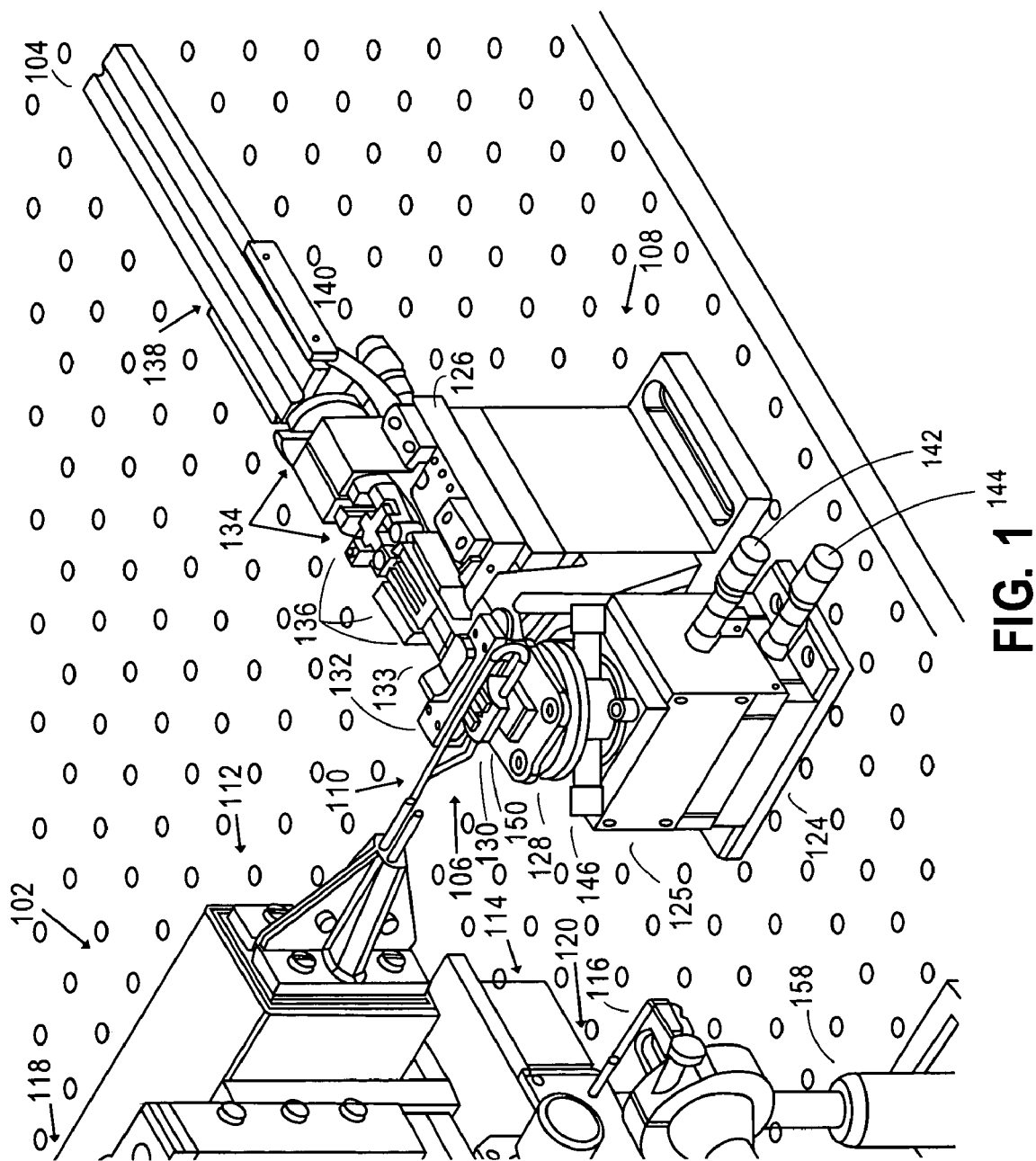
FIG. 1 illustrates an offset side view an embodiment of an example induction soldering station to induction solder an optical fiber to an optical alignment component and an alignment tool to hold the optical fiber and optical alignment component in place during the induction soldering.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory columns in a group of memory columns, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, various methods, apparatuses, and systems are described in which an alignment tool holds an optical fiber and an optical alignment component in place during induction soldering. The alignment tool has alignment adjustments for the optical fiber as well as the optical alignment component. An induction soldering station induction solders the optical fiber to the optical alignment component in order to secure the optical fiber to the optical alignment component.

FIG. 1 illustrates an offset side view an embodiment of an example induction soldering station to induction solder an optical fiber to an optical alignment component and an alignment tool to hold the optical fiber and optical alignment component in place during the induction soldering. In an embodiment, the induction soldering station 102 solders the optical fiber 104 to the optical alignment component 106, such as a flexure or other adjustable platform, in order to secure the optical fiber 104 to the optical alignment component 106. The alignment tool 108 has alignment adjustments for the optical fiber 104 as well as the optical alignment component 106. The alignment tool 108 holds the optical fiber 104 and the optical alignment component 106 in place during the induction soldering.

An embodiment of the induction soldering station 102 may have one or more of the following components: a formed induction coil 110; an induction head 112; and a body 114 mounted on a linear slide 116. The induction coil 110 may be formed to any shape that can enclose the optical fiber 104, the optical alignment component 106, and the fixture 130. The induction head 112 has coarse X, Y, and Z manual alignment capability 118, 120 122 to assist in positioning the induction coil 110. The induction coil 110 connects to the linear slide 116, via the body 114, to engage and disengage with the alignment tool 108.

An embodiment of the alignment tool 108 may have one or more of the following components: a Y-axis stage 124; a Z-axis stage 125; Theta adjustment rotational stage 128; a fixture 130; a ceramic pin clamp 132; a fiber clip 133; a fiber orientation rotator 134; an X-axis stage 126; optical fiber guides and clamps 136; and a grooved support 138. The alignment tool 108 also has alignment adjustments in the X-axis 140, the Y-axis 142, the Z-axis 144, and the Theta axis 146, to ensure correct alignment of the optical fiber 104, optical alignment component 106, and the optical alignment component 106 with respect to the optical fiber 104. In an embodiment, the X-axis is parallel to the groove in the grooved support 138. The Y-axis is parallel to the formed induction coil 110. The Z-axis rises vertically from, for example, the Y-axis stage 124 up to the formed induction coil 110. The Theta axis 146 is elliptical in either a clockwise or counter clockwise direction. The fiber orientation rotator 134 may rotate the axis of the fiber + or −180 degrees from the centerline of the Z-axis.

The optical alignment component 106 may be placed in a fixture. 130, such as a nonmetallic fixture. In an embodiment, a nonmetallic fixture 130, such as a ceramic fixture, can withstand the radio frequency induction soldering process without generating any heat of its own. The optical fiber 104 may be positioned and aligned on top of the optical alignment component 106. During the soldering process the optical fiber 104 secures to the optical alignment component 106 when the solder cools down from the soldering process. In an embodiment, the optical fiber 104 has metallic aspects such as a metallic jacket. A higher quality solder joint between the optical fiber 104 and optical alignment component 106 may occur if only those two components have metallic parts to generate heat from the radio frequency induction soldering process.

In an embodiment, the fixture 130 may have a pocket sculpted into the fixture 130 to assist in maintaining the position of an optical alignment component 106 positioned on top of the fixture 130. In an embodiment, the geometric shape of the pocket may substantially match that of the optical alignment component 106.

As noted, the induction coil 110 being coupled to the linear slide 116 allows the induction coil 110 to remain physically out of the way until the optical fiber 104 and the optical alignment component 106 are properly positioned and aligned. The optical fiber 104 and the optical alignment component 106 may be viewed under a microscope, camera, or similar device during the alignment process to aid in aligning both components.

The optical fiber 104 may be placed in and guided by a clamp assembly 136 in the alignment tool 108. The fiber orientation rotator 134 allows the optical fiber 104 to be rotated around its axis during alignment. Adjustments to the rotational axis of the tip 150 of the optical fiber 104 can be made by fiber orientation rotator 134. The X-axis alignment knob 140 can make fine adjustments to the amount of overhang the optical fiber 104 has in relation to the optical alignment component 106. Adjustments to the optical alignment component 106 to ensure that the optical alignment component 106 is level and that the optical fiber rest level on the level optical alignment component 106 can be made by the Z-axis alignment knob 144. Adjustments to ensure that the optical fiber 104 rests in the center plane of the optical alignment component 106 can be made by the Theta rotational adjustment knob 146. Further adjustments to the Y-axis of the optical alignment component 106 resting in the non-metallic fixture 130 can be made by adjustments with the Y-axis adjustment knob 142.

Once the optical fiber 104 is aligned, the optical alignment component 106 is aligned, and the optical fiber 104 is aligned with respect to the optical alignment component 106, then the combination of the optical fiber 104 and optical alignment component 106 may be clamped and secured in place. Next, the body 114 of the induction soldering station 102 may be slid across the linear slide 116 to move the induction coil 110 into place over the combination of the optical fiber 104 and optical alignment component 106. The induction head 112 of the soldering station has course X, Y, and Z alignment knobs and capability to position the induction coil 110 at the desired angle and in the desired area over the optical fiber-optical alignment component combination. The linear slide 116 allows the soldering station to engage into position over the alignment tool 108 and disengage with the alignment tool 108.

Thus the optical fiber 104 is located and guided by a set of clamps 136 134 that allows the metallic optical fiber 104 to be rotated about it's axis and to allow it's amount of overhang past the optical alignment component 106 to be set. In an embodiment, the auxiliary light source 150 is used to set the alignment of the axis of the optical fiber 104. In an embodiment, the operator or a computer measures the amount of luminance reflected back off the polished fiber tip 150 and uses this reflective light as an indication that the fiber orientation is correctly aligned. The most amount of illumination will be reflected when the orientation of the tip of the fiber 150 is correctly aligned.

Once in place and aligned, the induction coil 110 produces radio frequencies to heat up the metallic flexure 106, solder, and metallic optical fiber 104 to cause the solder to melt. During this process a shielding gas may be directed to the area of the flexure 106 and optical fiber 104 in order to remove oxygen from the area surrounding the liquefied solder. The removal of oxygen removes oxidation from occurring in the solder joint securing the metallic optical fiber 104 to the flexure 106. The heat from the induction process generates the liquefied solder which when it cools permanently secures the aligned optical fiber 104, flexure 106, and optical fiber 104 with respect to the flexure 106. The temperature that the soldering coil generates may be controlled by a control module (not shown). Further, temperature that the soldering coil generates may be controlled by the shape, form, and angle of the induction coil 110.

Figure 2:
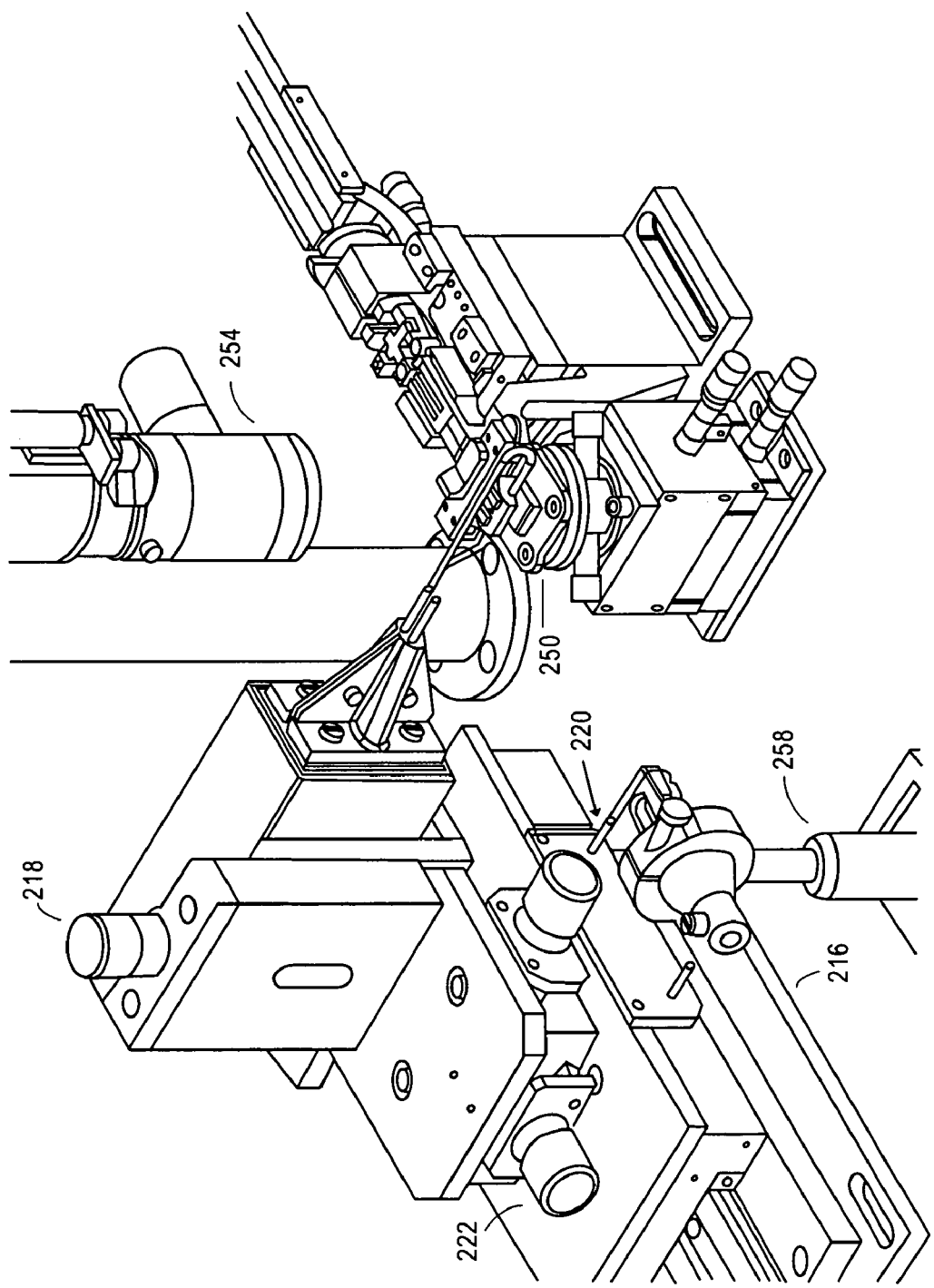
FIG. 2 illustrates an offset side view of an embodiment of the soldering station and the alignment tool.

FIG. 2 illustrates an offset side view of an embodiment of the soldering station and the alignment tool. In this embodiment, a microscope 254 is used to measure the amount of luminance from the tip of the optical fiber 250. This is just one method of ensuring the alignment of the optical fiber and others are possible. Also alternative devices such as a CCD camera may be employed to measure the amount of luminance in order to determine the alignment of an optical fiber.

Figure 3A:
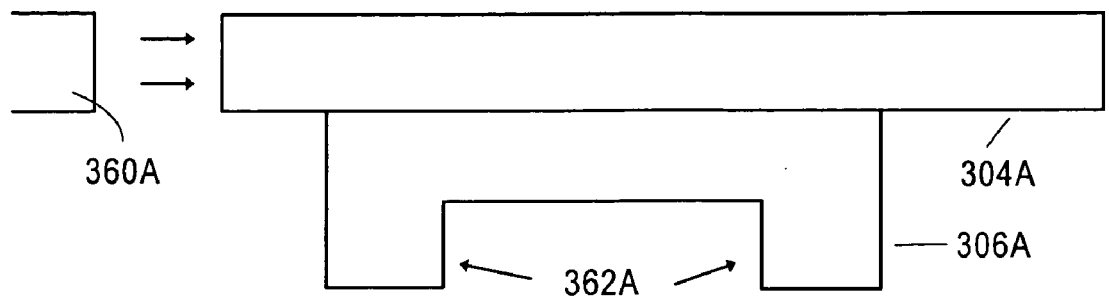
FIG. 3a illustrates a side view of an embodiment of an optical fiber mated to an optical alignment component in anticipation of being mated inside an optical package to another optical component, which is co-planar with the optical fiber.
Figure 3B:
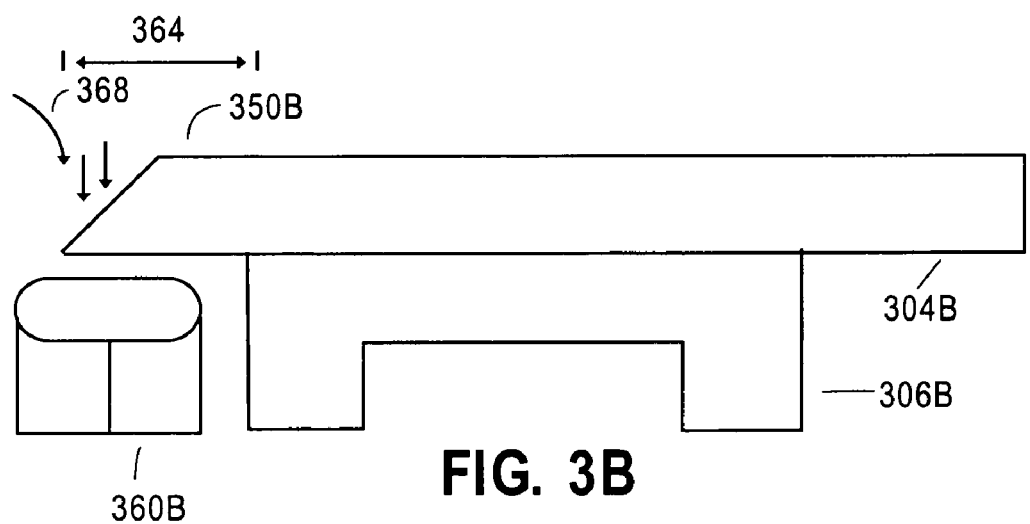
FIG. 3B illustrates a side view of an embodiment of an optical fiber mated to an optical alignment component in anticipation of being mated inside an optical package to another optical component, which is perpendicular with the optical fiber.
Figure 3C:
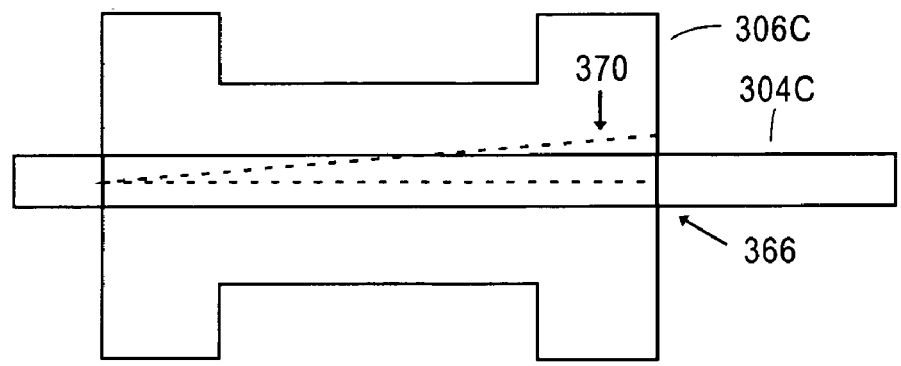
FIG. 3C illustrates a side view of an embodiment of the optical fiber being aligned to the centerline of the optical alignment component rather than being off-center.

FIGS. 3A, 3B, and 3C illustrate various aspects of the alignment of an optical fiber and an optical alignment component such as a flexure. Typically, in prior optical alignment techniques, an optical fiber and a flexure were soldered together, or bonded together when they were placed inside the optical package. The optical fiber and flexure were then aligned at that time with components already in the optical package. Thus, the optical package was built up and the flexure, the optical fiber, the optical fiber in respect to the flexure, and one or more components inside the package that optically mate up to the combination of the fiber and flexure were all aligned at the same time.

In an embodiment, the optical fiber 304 and the optical alignment component 306 are secured together by soldering after the alignment with respect to each other occurs but prior to any aligning of these components in an optical package to other components in the optical package. After the alignment of the optical fiber 304, the optical alignment component 306, and the optical fiber 304 with respect to the optical alignment component 306, fine alignment alterations are all that should be necessary in order to properly mate the optical fiber 304 to a second optical component 360 located inside the optical package.

FIG. 3a illustrates a side view of an embodiment of an optical fiber mated to an optical alignment component in anticipation of being mated inside an optical package to another optical component, which is co-planar with the optical fiber. Referring to FIG. 3a, the optical fiber 304a rests securely on a level plane with the optical alignment component 306a and in the same plane as the anticipated optical component 360a inside the optical package. Small adjustment can be made to the legs 362a of the optical alignment component 306a to align the optical fiber 304a to the optical component 360a inside the optical package.

FIG. 3B illustrates a side view of an embodiment of an optical fiber mated to an optical alignment component in anticipation of being mated inside an optical package to another optical component, which is perpendicular with the optical fiber. Referring to FIG. 3b, prior to the induction soldering process the metallic optical fiber 304b may be aligned to the optical alignment component 306b such that the overhang 364 of the fiber and the rotational angle 368 of the tip of the fiber 350b are substantially properly aligned. In anticipation of mating to an optical component 360b that is not in the same plane as the optical fiber 304b, the amount of overhang 364 and the rotational angle 368 of the optical fiber 304b are usually aligned and set prior to the induction soldering process. The anticipated amount of overhang 368 may be set by the X-axis adjustment of the alignment tool. Further, obtaining the correct orientation of the tip of the fiber 350b with respect to the axis of the optical fiber 304b may be set by the fiber orientation rotator. Subsequently, when the combined optical fiber 304b and optical alignment component 306b are mated to the optical component 360b inside the optical package, then the optical alignment component 306b may be positioned in relation to the optical component 360b to ensure the proper overhang 364. As shown in this example, the light traveling through the optical fiber 104 strikes the end of the optical fiber, which is terminated in a 45° tip 350b. The light strikes the 45° tip angle tip of the fiber 350b and reflects down at a 90° angle into the optical component 360b in the optical package awaiting that signal.

FIG. 3C illustrates a top down view of an embodiment of the optical fiber being aligned to the centerline of the optical alignment component rather than being off-center. Referring to FIG. 3c, the optical fiber 304c being aligned to the centerline 366 of the optical alignment component 306c is usually set prior to the induction soldering process. The series of clamps, pocket in the fixture, and the Y-axis adjustment of the alignment tool assist in aligning the optical fiber 304c to the centerline 366 of the optical alignment component 306c rather than being off-center 370.

Figure 4:
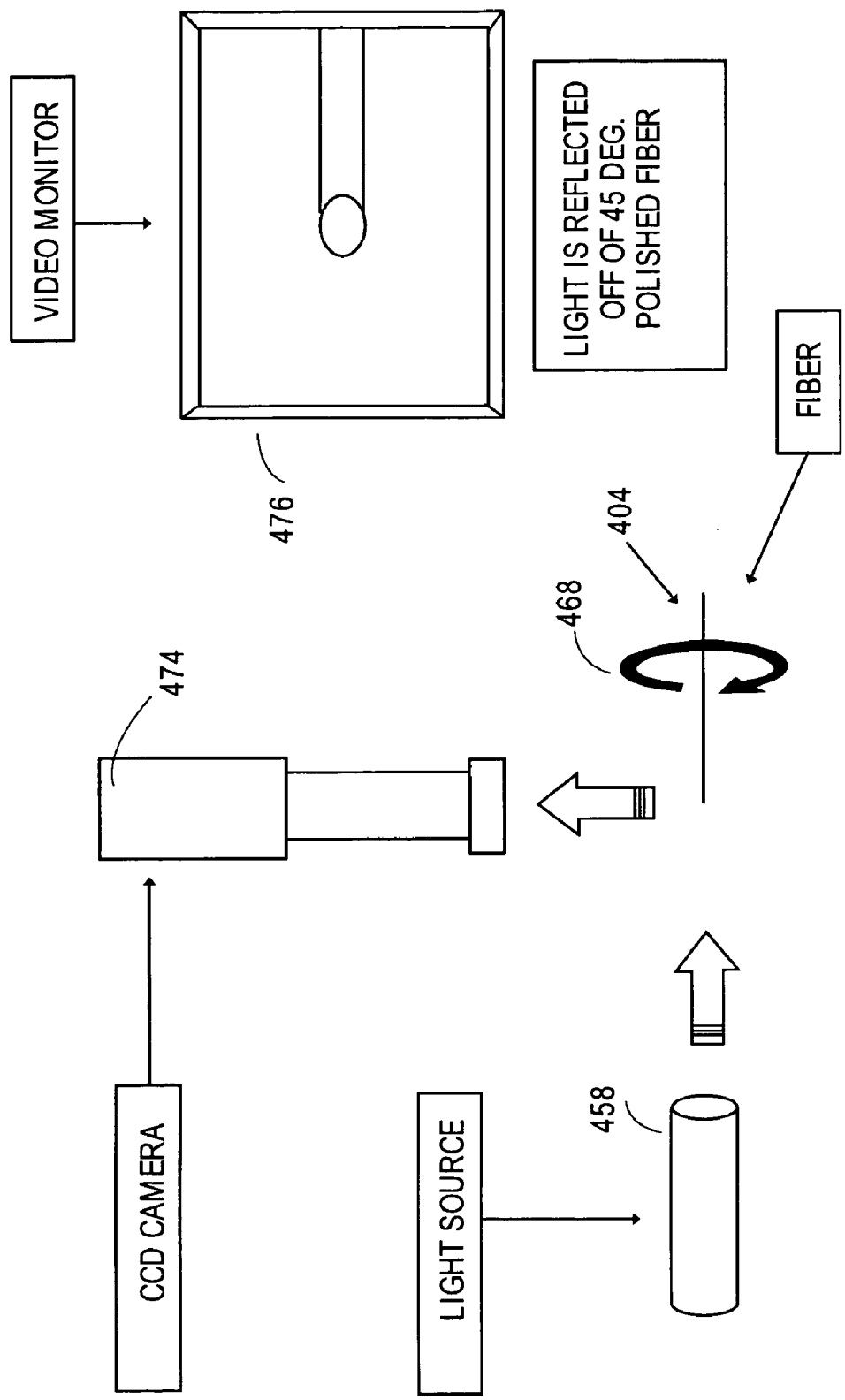
FIG. 4 illustrates a block diagram of an embodiment of a video monitor and CCD camera used to align the orientation and overhang of the metallic optical fiber.

FIG. 4 illustrates a block diagram of an embodiment of a video monitor and CCD camera used to align the orientation and overhang of the metallic optical fiber. The optical fiber 404 rotational orientation 468 can be done using the auxiliary light 458, a closed circuit camera 474, and a video monitor 476. In theory, an optical component perpendicular to the optical fiber inside the optical package receives the maximum amount of light being transmitted through the fiber when the light reflected from the rotational angle 468 of the optical fiber 404 is at the maximum amount of luminescence. Thus, an operator may adjust the fiber orientation rotator to align the optical fiber 404 until the tip is approximately at its brightest.

Figure 5:
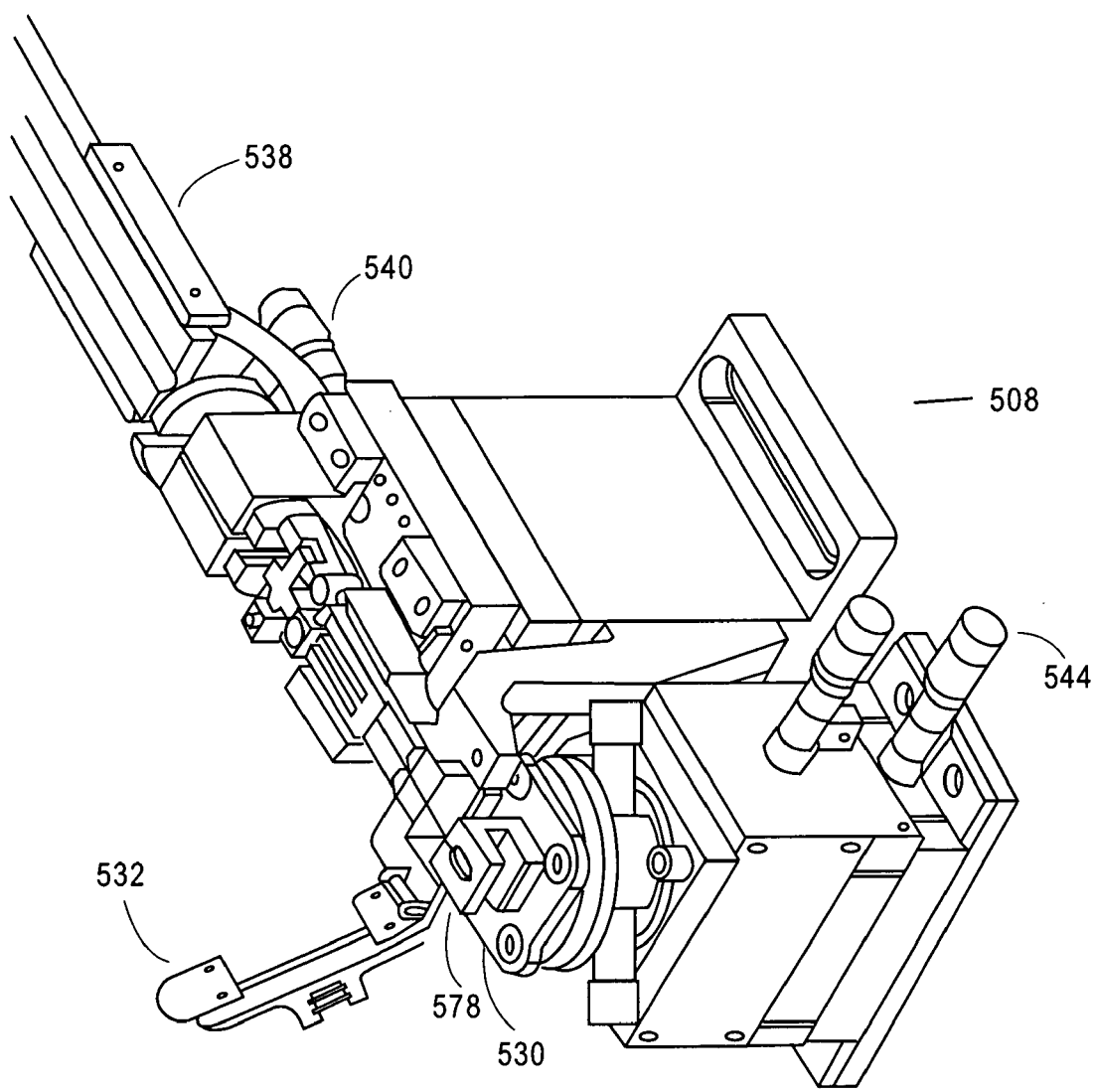
FIG. 5 illustrates an offset side view of an embodiment of an alignment tool with the ceramic pin clamp in its up position.

FIG. 5 illustrates an offset side view of an embodiment of an alignment tool with the ceramic pin clamp in its up position. Referring to FIG. 5, the ceramic pin clamp 532 is in its up position. The non-metallic fixture 530 has a pocket 578.

Figure 6B:
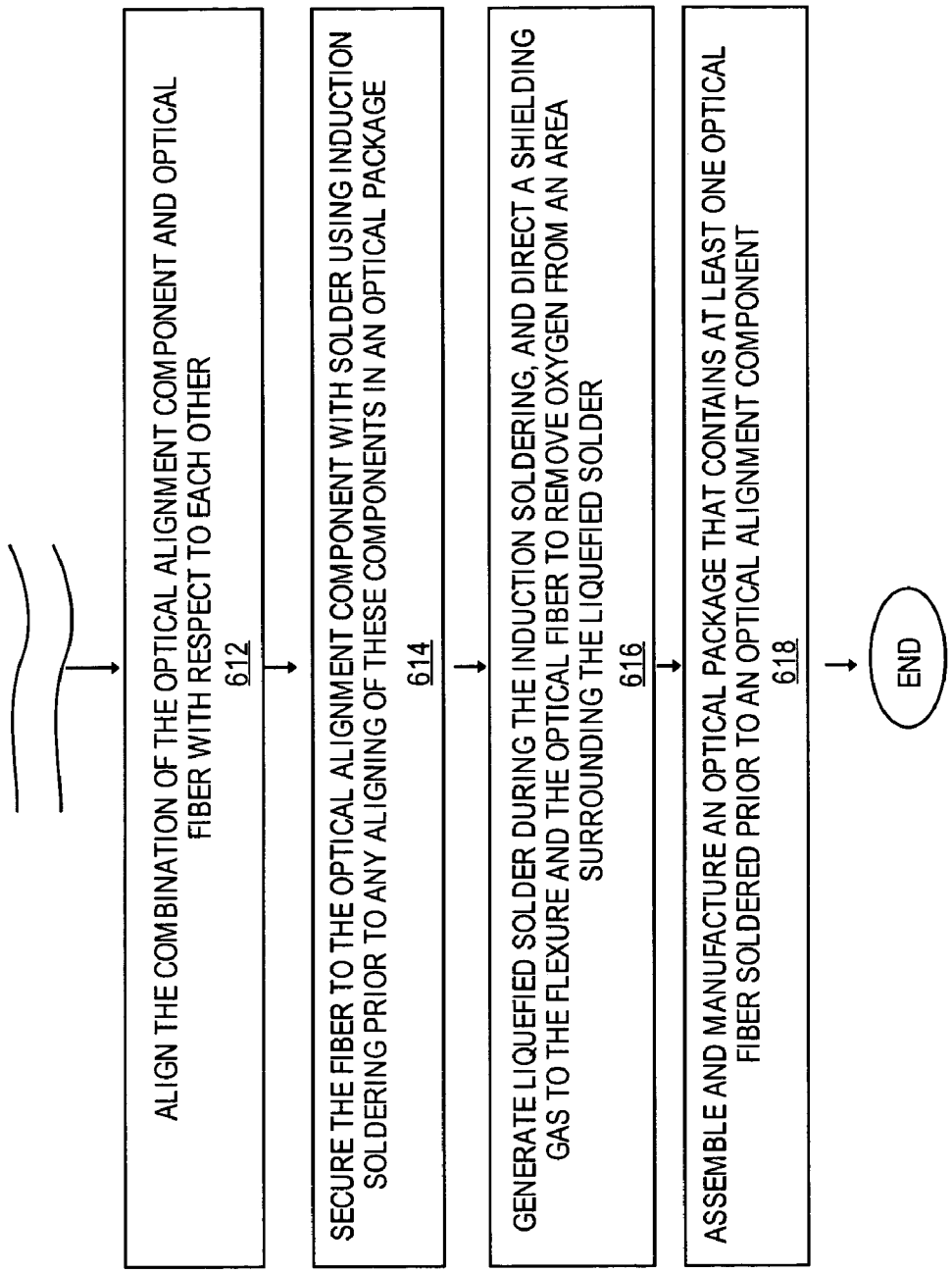

FIG. 6a and FIG. 6b illustrate a flow diagram of an operational sequence to generate an optical package made by an embodiment of the alignment tool and the induction soldering station.

In block 602, the flexure may be aligned in the alignment tool by opening the ceramic pin clamp, fiber clip, and fiber rotator clamp. The optical fiber may be placed into the alignment tool. The optical fiber may be placed in the channel running through the grooved support, in the series of clamps, and under the ceramic pin clip. Placing the optical alignment component in the fixture.

In block 604, the optical fiber may be aligned with respect to the optical alignment component. An operator may coarsely align the X-Axis of the fiber by roughly adjusting the amount of overhang of the fiber with respect to the optical alignment component. The operator may manually rotate the fiber to coarsely align the axial orientation of the fiber.

In block 606, the optical fiber may be secured in the alignment tool by closing all the clamps. The operator may close the ceramic pin clamp, fiber clip, and fiber rotator clamp.

In block 608, the X-axis of the optical fiber may be finely aligned with an X-Axis translation stage micrometer and use of the image on the video monitor as the reference fiber.

In block 610, the rotational orientation of the optical fiber may be finely aligned with using the fiber rotator adjustment. In an embodiment, the image of the fiber on a video monitor or in a microscope may be used in conjunction with the axial light source to determine when the fiber is oriented properly. Thus, the angle of the tip of the fiber with respect to the axis orientation of the fiber may be aligned by the amount of reflected light from the tip of the fiber.

In block 612, the combination of the optical alignment component and optical fiber may be aligned. The ceramic pin clamp on top of the fiber and the optical alignment component may be firmly secured and latched in place. The optical alignment component may be aligned by the Z-axis to ensure that the optical alignment component and optical fiber are level with respect to each other. The position and alignment of the optical alignment component with may be adjusted using the Y, Z, and Theta-Axes stages. Further, the position of the optical alignment component and optical fiber may be rechecked.

In block 614, the fiber may be permanently secured to the optical alignment component with solder using induction soldering. The induction coil may be slid into position. The heat from the induction coil generates liquefied solder during the induction soldering. The optical fiber may be tinned with solder prior to be placed in the alignment tool. In an embodiment, no flux is added to solder during the induction soldering of the optical fiber to the flexure. Thus, the induction soldering of the optical fiber to the flexure is a fluxless process.

In block 616, a shielding gas is directed to the flexure and optical fiber to remove oxygen from the area surrounding the liquefied solder. When the solder cools, the clamps are opened up. The optical fiber secured to the optical alignment component is removed from the alignment tool. Thus, the optical fiber and the optical alignment component are soldered together prior to any aligning of these components in an optical package.

In block 618, an optical package that contains at least one optical fiber secured to an optical alignment component may be assembled and manufactured. One or more of the above combinations of an optical fiber secured to an optical alignment component are aligned to component inside an optical package. The optical package is typically hermetically sealed after the alignment and testing of the optical component within the optical package is complete.

While some specific embodiments of the invention have been shown the invention is not to be limited to these embodiments. For example, the geometric shape of the components may be altered. The radiant heat from the induction soldering station may be a laser. The invention is to be understood as not limited by the specific embodiments described herein, but only by scope of the appended claims.

What is claimed is:

1. An apparatus, comprising:
   an alignment tool having alignment adjustments for an optical fiber as well as an optical alignment component, the optical alignment component being a flexure; and
   a soldering station to induction solder the optical fiber to the optical alignment component in order to secure the optical fiber to the optical alignment component, wherein the alignment tool holds the optical fiber and the optical alignment component in place during the induction soldering.

2. The apparatus of claim 1, wherein the optical fiber and the optical alignment component are soldered together prior to aligning the optical fiber and optical alignment component in an optical package.

3. The apparatus of claim 1, wherein the soldering station uses a fluxless process to perform the induction soldering of the optical fiber to the optical alignment component.

4. The apparatus of claim 1, wherein the optical fiber is a metallic optical fiber.

5. The apparatus of claim 1, wherein the alignment tool has alignment adjustments in the X-axis, the Z-axis, and the Theta-axis.

6. The apparatus of claim 1, wherein the alignment tool has a pocket in a non-metallic fixture to hold the optical alignment component in place.

7. The apparatus of claim 1, wherein the induction soldering station further comprises:
   an induction coil to provide radio frequency soldering energy.

8. The apparatus of claim 7, wherein the induction coil couples to a slide mechanism that allows the induction coil to remain physically out of the way until the optical fiber and the optical alignment component are properly positioned and aligned.

9. A method of aligning an optical fiber to a flexure, comprising:
   positioning the optical fiber in the flexure;
   aligning the optical fiber with respect to the flexure;
   securing the optical fiber to the flexure; and
   soldering the optical fiber to the flexure using induction soldering.

10. The method of claim 9, further comprising:
    soldering the optical fiber to the flexure prior to any aligning of these components in an optical package.

11. The method of claim 10, further comprising:
    aligning an angle of a tip of the optical fiber with respect to an axis orientation of the optical fiber.

12. The method of claim 9, further comprising:
    generating liquefied solder during the induction soldering; and
    directing a shielding gas to the flexure and the optical fiber to remove oxygen from an area surrounding the liquefied solder.

13. The method of claim 9, further comprising:
    aligning the Z-axis of the flexure and the optical fiber to ensure that both are level and share a common centerline with respect to each other.

14. An article of manufacture, comprising:
    an optical package that contains an optical fiber secured to a flexure manufactured according to the process of claim 9.

15. The article of manufacture of claim 14, wherein the optical fiber is secured to the flexure prior to aligning of these components in the optical package.

16. The article of manufacture of claim 14, wherein the optical fiber is a metallic optical fiber.

17. An apparatus, comprising:
- an alignment tool having alignment adjustments for an optical fiber and for an optical alignment component; and
- a soldering station to induction solder the optical fiber to the optical alignment component in order to secure the optical fiber to the optical alignment component,
- wherein the alignment tool is to hold the optical fiber and the optical alignment component in place during the induction soldering,
- wherein the optical fiber and the optical alignment component are to be soldered together prior to aligning the optical fiber and optical alignment component in an optical package, wherein the optical fiber is a metallic optical fiber.

18. The apparatus of claim 17, wherein the soldering station is to use a fluxless process to perform the induction soldering of the optical fiber to the optical alignment component.

19. An apparatus, comprising:
- an alignment tool having alignment adjustments for an optical fiber and for an optical alignment component; and
- a soldering station to induction solder the optical fiber to the optical alignment component in order to secure the optical fiber to the optical alignment component,
- wherein the alignment tool is to hold the optical fiber and the optical alignment component in place during the induction soldering,
- wherein the alignment tool has a pocket in a non-metallic fixture to hold the optical alignment component in place.

20. The apparatus of claim 19, wherein the alignment tool has alignment adjustments in the X-axis, the Z-axis, and the Theta-axis.

21. An apparatus, comprising:
- an alignment tool having alignment adjustments for an optical fiber and for an optical alignment component; and
- a soldering station to induction solder the optical fiber to the optical alignment component in order to secure the optical fiber to the optical alignment component,
- wherein the alignment tool is to hold the optical fiber and the optical alignment component in place during the induction soldering,
- wherein the induction soldering station further comprises an induction coil to provide radio frequency soldering energy.

22. The apparatus of claim 21, wherein the induction coil couples to a slide mechanism to allow the induction coil to remain physically out of the way until the optical fiber and the optical alignment component are properly positioned and aligned.

* * * * *